Patented Nov. 1, 1932

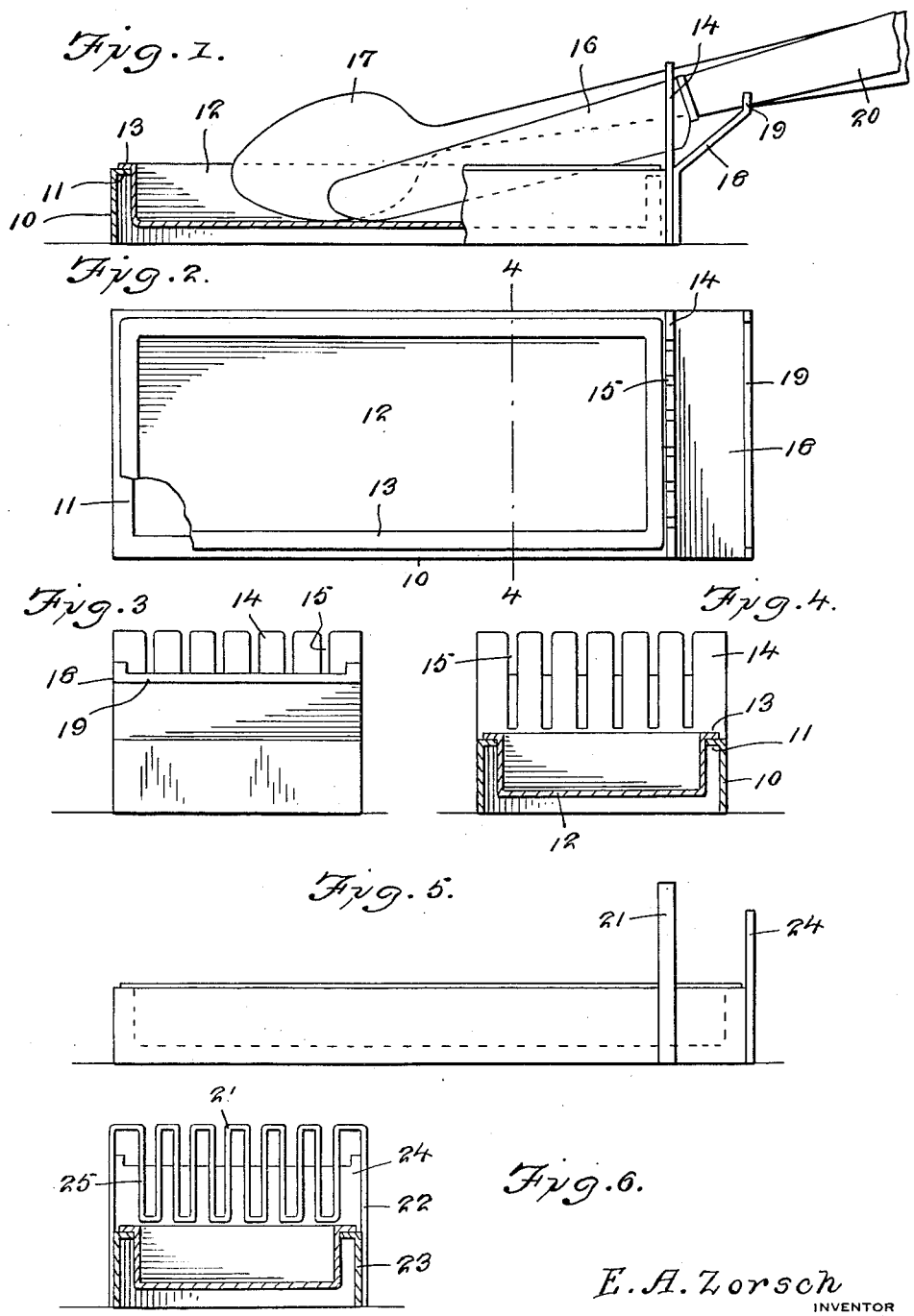

1,886,075

UNITED STATES PATENT OFFICE

EDWARD A. ZORSCH, OF ROCHESTER, NEW YORK

KNIFE AND SPOON PAN RACK

Application filed May 12, 1931. Serial No. 536,874.

The invention relates to a combined pan or tray and rack and more particularly to a knife and spoon pan rack.

The primary object of the invention is the provision of a device of this character wherein knives and spoons can be conveniently held therein when not in use, especially during the cooking period in the preparation of a meal, as the knives and spoons when placed within the device will be held readily accessible for use.

Another object of the invention is the provision of a device of this character, wherein the rack is of novel form to sustain knives and spoons separated from each other and in position for free accessibility or for selective use.

A further object of the invention is the provision of a device of this character which is extremely simple in construction, neat and attractive in appearance, thoroughly reliable and efficient, readily portable and inexpensive to manufacture.

With these and other objects in view, the invention consists in the features of construction, combination and arrangement of parts as will be hereinafter more fully described in detail, illustrated in the accompanying drawing, which discloses the preferred embodiment of the invention, and pointed out in the claims hereunto appended.

In the accompanying drawing:—

Figure 1 is an elevation of a knife and spoon pan rack constructed in accordance with the invention showing a portion thereof partly broken away and a knife and spoon held therein.

Figure 2 is a top plan view with the knife and spoon removed, one corner of the pan being broken away.

Figure 3 is an end elevation.

Figure 4 is a sectional view on the line 4—4 of Figure 2.

Figure 5 is a side elevation of a slight modification of the invention.

Figure 6 is a vertical transverse sectional view thereof looking in the direction of the rack.

Similar reference characters indicate corresponding parts throughout the several views in the drawing.

Referring to the drawing in detail, particularly Figures 1 to 4 inclusive, the knife and spoon pan rack comprises a body 10 preferably of rectangular formation and made from sheet metal having provided at its top a rest flange 11 marginally of the open center of said body 10 for accommodating in this open center a pan or tray 12 having a marginal rim 13 to engage and rest upon the flange 11 on the body 10. The pan or tray 12 is removable from the body 10 as will be obvious.

At one end of the body 10 is an upright plate 14 having cut through its top edge at intervals thereof vertical slots 15, these being an equi-distance apart and in this manner the rack is formed for accommodating knives 16 and spoons 17 respectively which are placed within the slots 15 edgewise as shown in Figure 1 of the drawing.

Outside of the plate 14 is an angular support 18 which at the upper edge portion thereof is formed a rest 19 for the handles 20 of the knives and spoons 16 and 17 when within the rack. This rest is spaced the required distance from the rack preferably as shown in Figures 1 and 2 of the drawing.

In Figures 5 and 6 of the drawing there is shown a slight modification of the invention, wherein a knife and spoon rack 21 bent from a single strip of metal, with the end portions 22 of the same serving as the legs for said rack and these portions being secured or joined with the body 23 exteriorly thereof in any suitable manner. The rack 21 is spaced inwardly from a rest 24 carried at the end of the body 23 of the device. The bends 25 of the rack provide the spaces for the knives and spoons 16 and 17 when the latter are placed therein edgewise in the manner as shown in Figure 1 of the drawing, while the handles 20 will bear upon the rest 24 and these knives and spoons will be held convenient to the user of the device.

What is claimed is:

1. A device of the class described comprising a body formed of a substantially rectangular-shaped frame open throughout its extent and having at its marginal top edge an inbent rest flange unbroken throughout said edge, a tray received in the frame and having an outturned marginal flange to rest upon the flange of the frame and overlap the same, an upright plate carried at one end of the frame and extended above the plane of the top thereof and having vertical slots disposed an equi-distance from each other, and means on the plate and projected laterally outwardly therefrom to constitute a rest for articles when engaged in the slots and received in the tray.

2. A device of the class described comprising a body formed of a substantially rectangular-shaped frame open throughout its extent and having at its marginal top edge an inbent rest flange unbroken throughout said edge, a tray received in the frame and having an outturned marginal flange to rest upon the flange of the frame and overlap the same, an upright plate carried at one end of the frame and extended above the plane of the top thereof and having vertical slots disposed an equi-distance from each other, and an angular support carried by the plate and offset therefrom with its upper edge constituting a rest rack for articles when engaged in the slot and disposed in the tray.

3. A device of the class described comprising a body formed of a substantially rectangular-shaped metal frame open throughout its extent and having at its top edge a rest flange marginally thereof, a tray received in the frame and having a marginal flange engaged with the flange of the frame and overlapping the same, a rack disposed at one end of the frame and having a plurality of vertical slots disposed an equidistance apart for accommodating articles to be disposed edgewise within the tray, and a rest outside of the frame and spaced from the rack to accommodate handle ends of such articles.

In testimony whereof I affix my signature.

EDWARD A. ZORSCH.